(12) United States Patent
Tseng

(10) Patent No.: US 8,726,300 B2
(45) Date of Patent: May 13, 2014

(54) BUILT-IN DISK DRIVER AND RELATED THIN COMPUTER DEVICE

(75) Inventor: Tien-Chung Tseng, New Taipei (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 0 days.

(21) Appl. No.: 13/609,277

(22) Filed: Sep. 11, 2012

(65) Prior Publication Data

US 2013/0339985 A1    Dec. 19, 2013

(30) Foreign Application Priority Data

Jun. 15, 2012   (TW) .............................. 101121547 A

(51) Int. Cl.
*G11B 17/03*   (2006.01)
(52) U.S. Cl.
USPC ........................................................ 720/653
(58) Field of Classification Search
USPC .............................................................. 720/653
See application file for complete search history.

(56) References Cited

U.S. PATENT DOCUMENTS

| | | | |
|---|---|---|---|
| 6,208,506 B1* | 3/2001 | Pao | 361/679.33 |
| 7,243,358 B2* | 7/2007 | Bae | 720/652 |
| 7,559,069 B2* | 7/2009 | Sekita | 720/671 |
| 7,663,999 B2* | 2/2010 | Omori et al. | 369/75.11 |
| 8,136,132 B2* | 3/2012 | Lee | 720/695 |
| 8,225,340 B2* | 7/2012 | Xu | 720/667 |
| 2008/0080083 A1* | 4/2008 | Homer et al. | 360/51 |

* cited by examiner

*Primary Examiner* — Mark Blouin
(74) *Attorney, Agent, or Firm* — Winston Hsu; Scott Margo

(57) ABSTRACT

A computer device with a built-in disk driver is disclosed in the present invention. The thin computer device includes a casing for accommodating at least one electronic component. A sunken structure is disposed on a surface of the casing. The thin computer device further includes a disk driver movably disposed inside the sunken structure. The disk driver includes a tray, a drive motor, a track set, and an optical read-in module. The tray movably connected to the casing for holding an optical disk. The drive motor disposed on the tray. The track set disposed on the tray. The optical read-in module slidably disposed on the track set. The optical read-in module reads information from the optical disk when the tray holds the optical disk and is located outside the sunken structure.

17 Claims, 7 Drawing Sheets

BUILT-IN DISK DRIVER AND RELATED THIN COMPUTER DEVICE

BACKGROUND OF THE INVENTION

1. Field of the Invention

The present invention relates to a disk driver and a related computer device, and more particularly, to a built-in disk driver and a related thin computer device.

2. Description of the Prior Art

A conventional portable computer device, such as a notebook computer, utilizes a disk driver to read software, video and music from an optical disk. The conventional standard disk driver has a predetermined thickness, and is disposed inside a casing of the portable computer device and under a keyboard. Therefore, a thickness of the portable computer device is no less than the total thickness of the conventional standard disk driver plus the keyboard. With the advanced technology, a thin notebook computer becomes popular in the consumptive market. A thickness of the thin notebook computer is generally between 1.8 cm to 2.1 cm, which is less than the total thickness of the conventional standard disk driver plus the keyboard. Due to above-mentioned reason, an external disk driver is equipped for the existing thin notebook computer. The external disk driver is carried with the thin notebook computer for backup. Thus, design of a computer device having thin structure and a built-in disk driver is an important issue of the computer industry.

SUMMARY OF THE INVENTION

The present invention provides a built-in disk driver and a related thin computer device for solving above drawbacks.

According to the claimed invention, a computer device with a built-in disk driver is disclosed. The computer device includes a casing for accommodating at least one electronic component. A sunken structure is disposed on a surface of the casing. The computer device further includes a disk driver movably disposed inside the sunken structure. The disk driver includes a tray, a drive motor, a track set and an optical read-in module. The tray is movably connected to the casing for holding an optical disk. The drive motor is disposed on the tray. The track set is disposed on the tray. The optical read-in module is slidably disposed on the track set. The optical read-in module reads information from the optical disk when the tray holds the optical disk and is located outside the sunken structure.

According to the invention, the computer device further includes a keyboard disposed inside the casing. A position of the disk driver does not overlap a position of the keyboard inside the casing.

According to the invention, the disk driver further includes a driving circuit disposed inside the tray or the casing. The disk driver is disposed inside the sunken structure in a rotatable manner. The tray pivots to the casing. The optical read-in module is actuated to read the optical disk when the disk driver moves out of the casing. The disk driver further includes a pivot mechanism disposed inside the sunken structure and close to an outer of the casing. The tray pivots to the casing via the pivot mechanism. The tray covers the sunken structure when the disk driver is accommodated inside the sunken structure.

According to the invention, an angle between the disk driver and the casing is substantially between 90 degrees and 180 degrees. A length of the tray is substantially greater than a radical dimension of the optical disk. In another embodiment, the disk driver is disposed inside the sunken structure in a drawable manner. The tray can be slidably disposed on the casing. The optical read-in module is actuated to read the optical disk when the disk driver moves out of the casing. The disk driver further includes a slide mechanism disposed inside the sunken structure and connected to the tray. The slide mechanism moves the tray into and out of the sunken structure. The disk driver further includes a cover pivotably disposed on an edge of the tray. The cover covers an opening of the sunken structure when the tray moves into the sunken structure.

According to the invention, the computer device further includes an external protection cap for capping the disk driver and the optical disk when the disk driver moves out of the sunken structure. The external protection cap can be partly connected to the casing when capping the disk driver and the optical disk.

According to the invention, a built-in disk driver disposed on the thin computer device is disclosed. The disk driver includes a tray, a drive motor, a track set and an optical read-in module. The tray is movably connected to the casing for holding an optical disk. The drive motor is disposed on the tray. The track set is disposed on the tray. The optical read-in module is slidably disposed on the track set. The optical read-in module reads information from the optical disk when the tray holds the optical disk and is located outside the sunken structure.

The computer device of the present invention can include equipment of the built-in disk driver and the slim casing. The built-in simple disk driver of the present invention is accommodated inside the casing when not in use, and can rapidly move out of the sunken structure of the casing for reading the optical disk. Thus, the present invention has advantages of simple structure, easy operation and low manufacturing cost, can effectively increase market competition of the computer device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
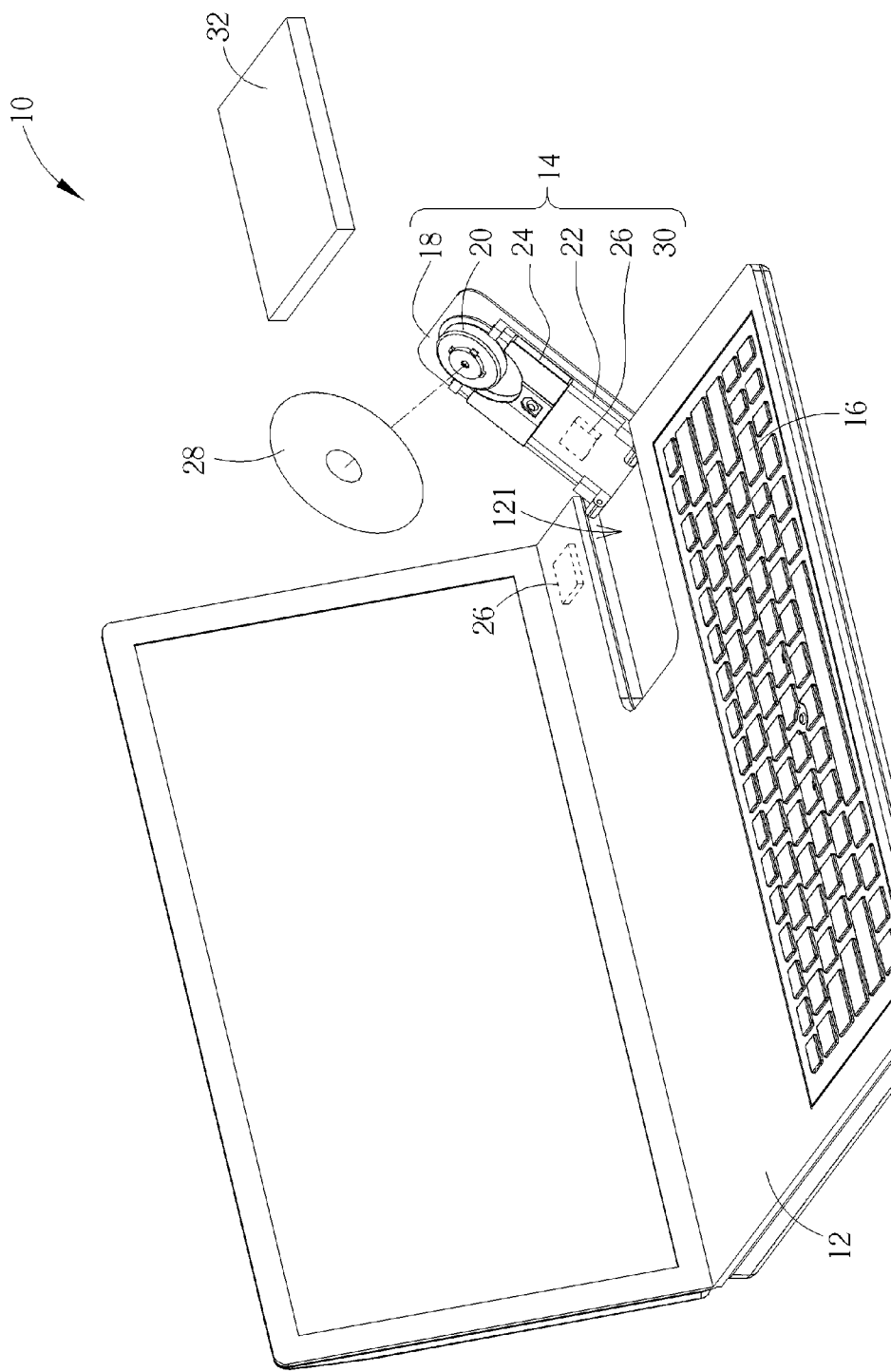
FIG. 1 is a diagram of a computer device according to a first embodiment of the present invention.

Please refer to FIG. 1, a diagram of a computer device 10 according to a first embodiment of the present invention. The computer device 10 includes a casing 12, a disk driver 14 and a keyboard 16. A plurality of electronic components is accommodated inside the casing 12, and the electronic component can be a main board, a processor, a memory, a hard disk and so on. A sunken structure 121 is formed on a surface of the casing 12. A thickness of the casing 12 can be substantially greater than thicknesses of the disk driver 14 or the keyboard 16, and be substantially smaller than a total thickness amount of the disk driver 14 plus the keyboard 16. The disk driver 14 is movably disposed inside the sunken structure 121, and the keyboard 16 is also disposed inside the casing 12 but away from the disk driver 14. It is to say, a position of the keyboard 16 does not overlap a position of the disk driver 14 inside the casing 12. Therefore, the computer device 10 with the disk driver 16 of the present invention can effectively decrease its structural thickness.

Figure 2:
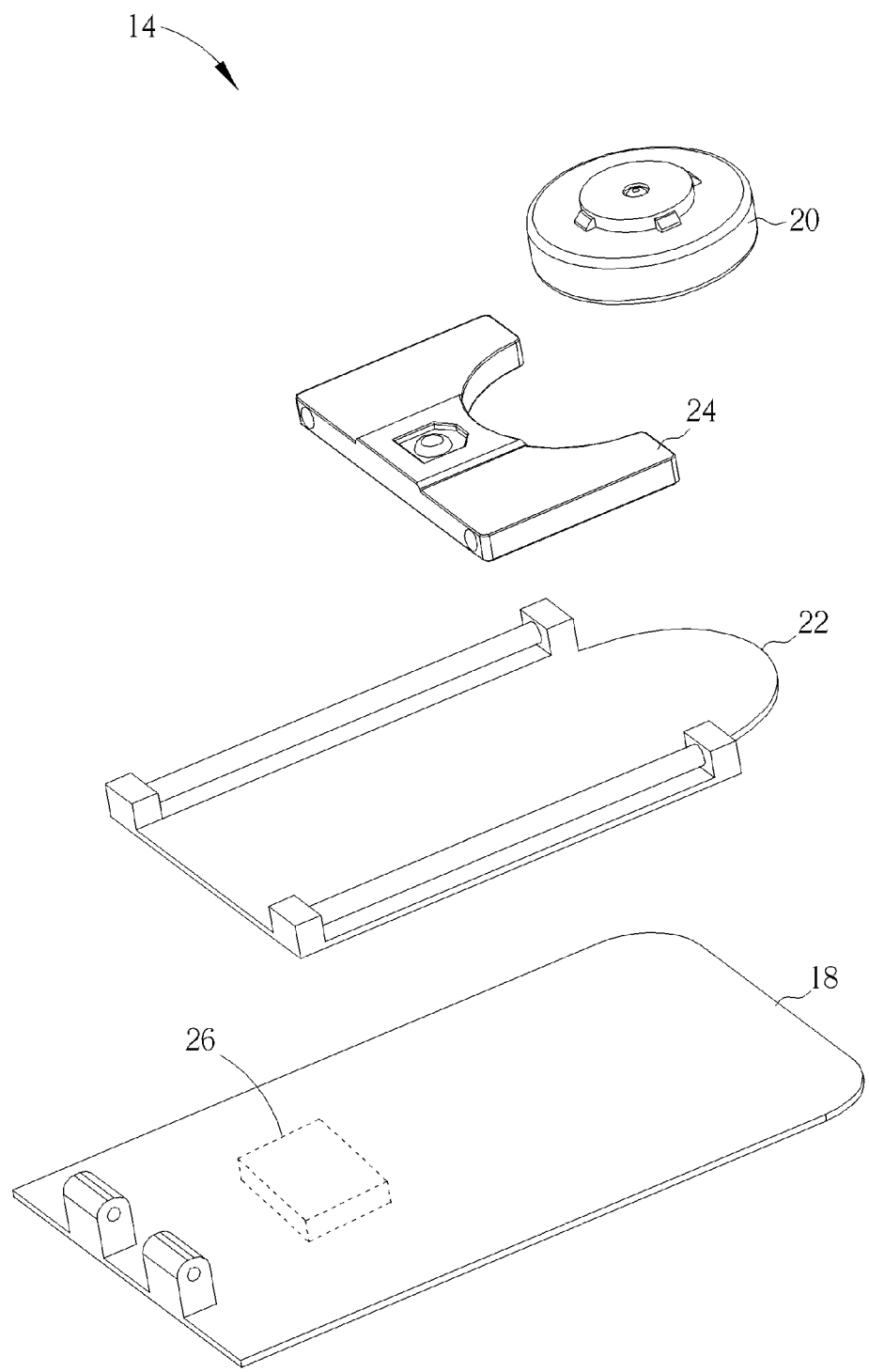
FIG. 2 is an exploded diagram of a disk driver according to the first embodiment of the present invention.

Please also refer to FIG. 2, an exploded diagram of the disk driver 14 according to the first embodiment of the present invention. The disk driver 14 includes a tray 18, a drive motor 20, a track set 22, an optical read-in module 24 and a driving circuit 26. The tray 18 is movably connected to the casing 12 for holding an optical disk 28. The drive motor 20 is disposed on the tray 18. The track set 22 is disposed by a side of the drive motor 20 and located on the tray 18. The optical read-in module 24 is slidably disposed on the track set 22. The driving circuit 26 is disposed inside the casing 12 or the tray 18, alternatively. A position of the driving circuit 26 depends on structural disposition, and a detailed description is omitted herein for simplicity. The driving circuit 26 is electrically connected to the drive motor 20 and the optical read-in module 24. A rotary speed of the drive motor 20 for the optical disk 28 and reading function of the optical read-in module 24 is controlled by the driving circuit 26. When the tray 18 holds the optical disk 28 and the disk driver 14 is located at an outer of the sunken structure 121, the drive motor 20 drives the optical disk 28 to rotate, and the optical read-in module 24 slides relative to the track set 22 for reading information from the optical disk 28.

Figure 3:
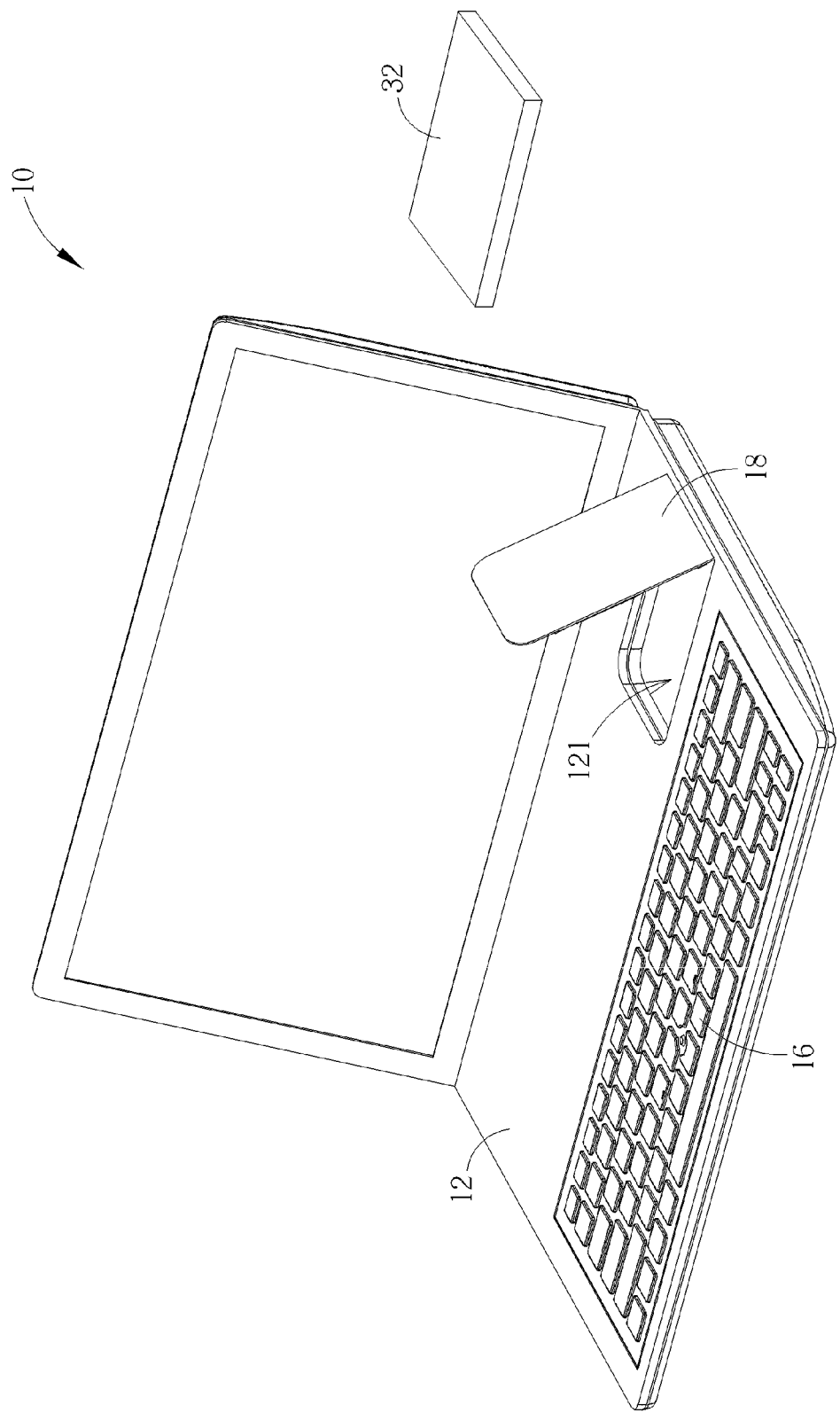
FIG. 3 and FIG. 4 respectively are diagrams of the computer device in different modes according to the first embodiment of the present invention.
Figure 4:
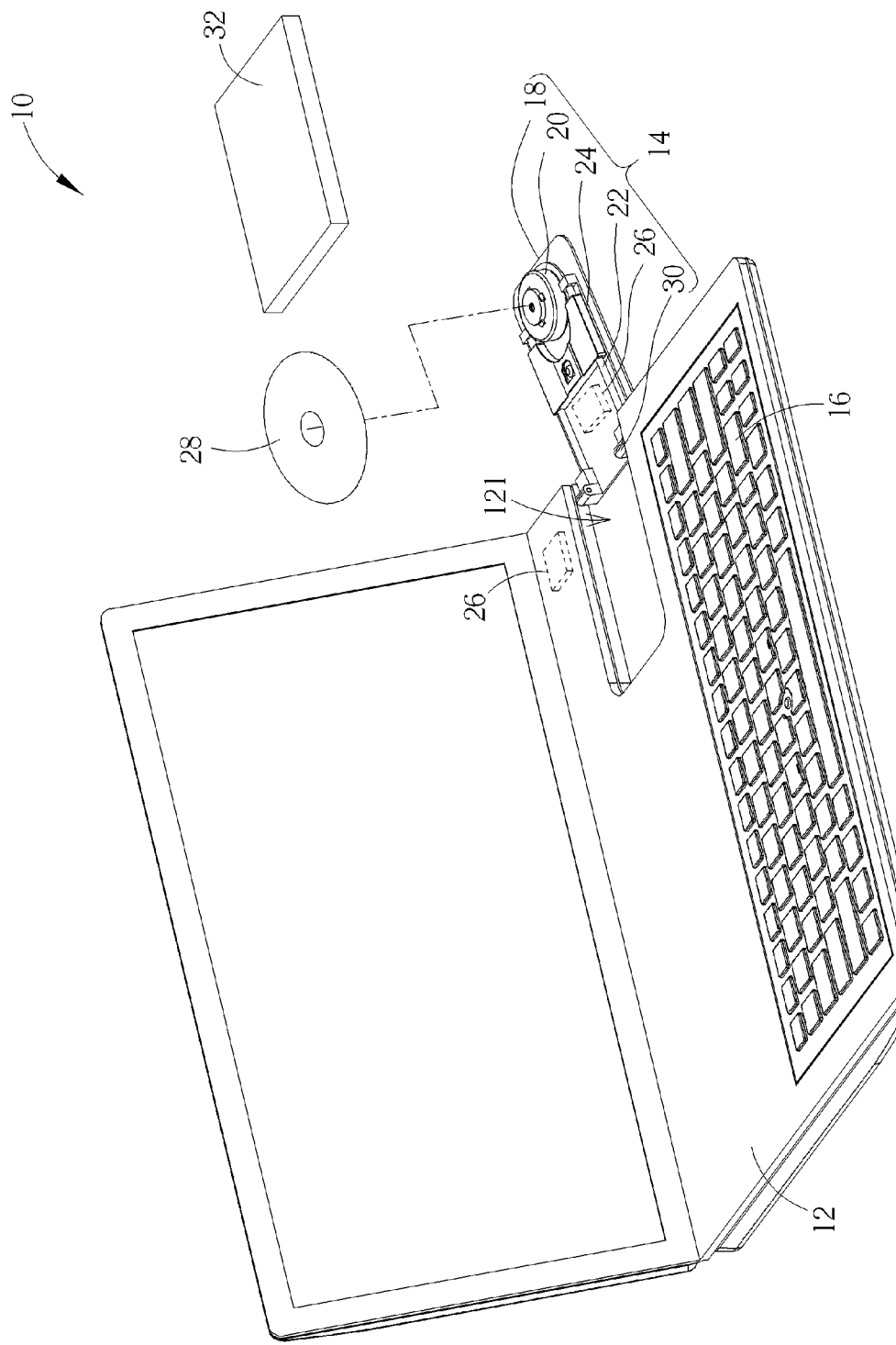

The disk driver 14 of the first embodiment further include a pivot mechanism 30 disposed inside the sunken structure 121 and located at a position adjacent to the outer of the casing 12. The tray 18 pivots to the casing 12 via the pivot mechanism 30, so that the disk driver 14 can move into and out of the sunken structure 121 in a rotatable manner. Please refer to FIG. 3 and FIG. 4. FIG. 3 and FIG. 4 respectively are diagrams of the computer device 10 in different operating modes according to the first embodiment of the present invention. As shown in FIG. 3, the disk driver 14 is accommodated inside the sunken structure 121, the tray 18 can completely cover the sunken structure 121, so as to prevent the electronic component inside the casing 12 from damage by the falling dust.

The disk driver 14 can be manually rotated out of the sunken structure 121, so as to put the optical disk 28 on the tray 18. As shown in FIG. 3 and FIG. 4, an angle between the tray 18 and the casing 12 of the disk driver 14 can be within a range of 0 degree to 180 degrees in the operating mode. A length of the tray 18 can be substantially greater than a radical dimension of the optical disk 28. The length of the tray 18 is designed and has no interference with the casing 12 when the optical disk 28 is put on the drive motor 20. Thus, the optical disk 28 put on the tray 18 does not contact the casing 12 after the disk driver 14 moves out of the sunken structure 121, no matter what the angle between the tray 18 and the casing 12 is.

Figure 5:
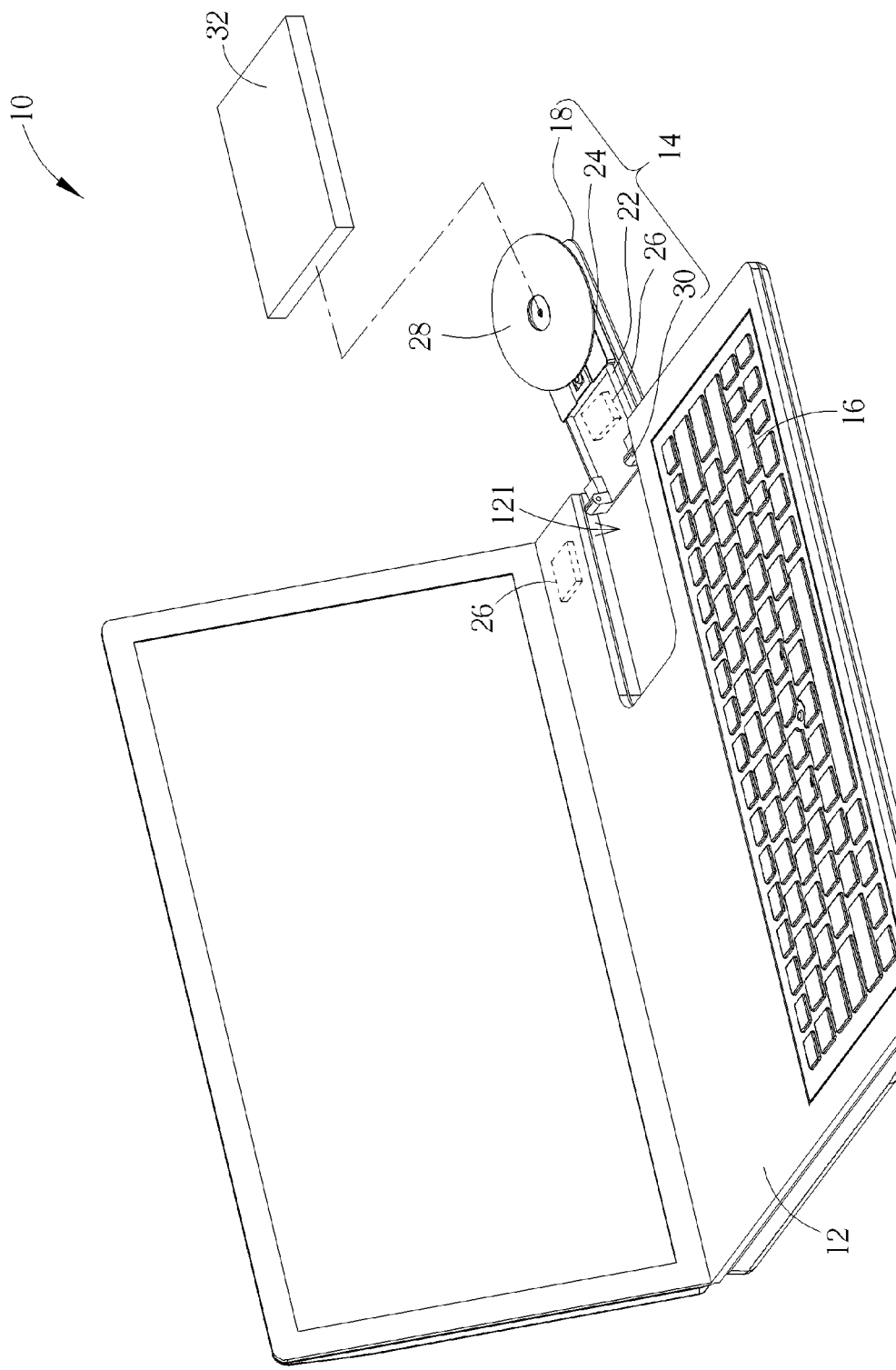
FIG. 5 is an assembly diagram of an optical disk and the disk driver according to the first embodiment of the present invention.

Please refer to FIG. 5. FIG. 5 is an assembly diagram of the optical disk 28 and the disk driver 14 according to the first embodiment of the present invention. As shown in FIG. 5, the disk driver 14 can be rotated relative to the casing 12 via the pivot mechanism 30, the angle between the disk driver 14 and the casing 12 can be greater than 90 degrees or be equal to 180 degrees, and then the optical disk 28 can be put on the disk driver 14 for read-in. Because the length of the tray 18 is greater than the radical dimension of the optical disk 28, the rotating optical disk 28 does not contact a screen or the casing of the computer device 10, so that damage of the optical disk 28 or the computer device 10 do not happen.

The computer device 10 can further include an external protection cap 32. Dimension of the external protection cap 32 is greater than dimensions of the optical disk 28. The external protection cap 32 is connected to the casing 12 via a fixing mechanism (not shown in figures) in a detachable manner. The fixing mechanism utilizes an engaging method or a buckling method to fix connection. The disk driver 14 of the present invention is running after the disk driver 14 with the optical disk 28 moves out of the casing 12, or selectively utilizes the external protection cap 32 to cover the optical disk 28 and the disk driver 14 when the disk driver 14 moves out of the casing 12 for protection. The external protection cap 32 prevents the user from hurt by the rotating optical disk 28, or prevents the optical disk 28 and the disk driver 14 from damage. When the external protection cap 32 covers the disk driver 14, the external protection cap 32 is partly connected to the casing 12 via the fixing mechanism, so the external protection cap 32 is stably fixed. Selection and disposition of the external protection cap 32 depend on user's demand.

Figure 6:
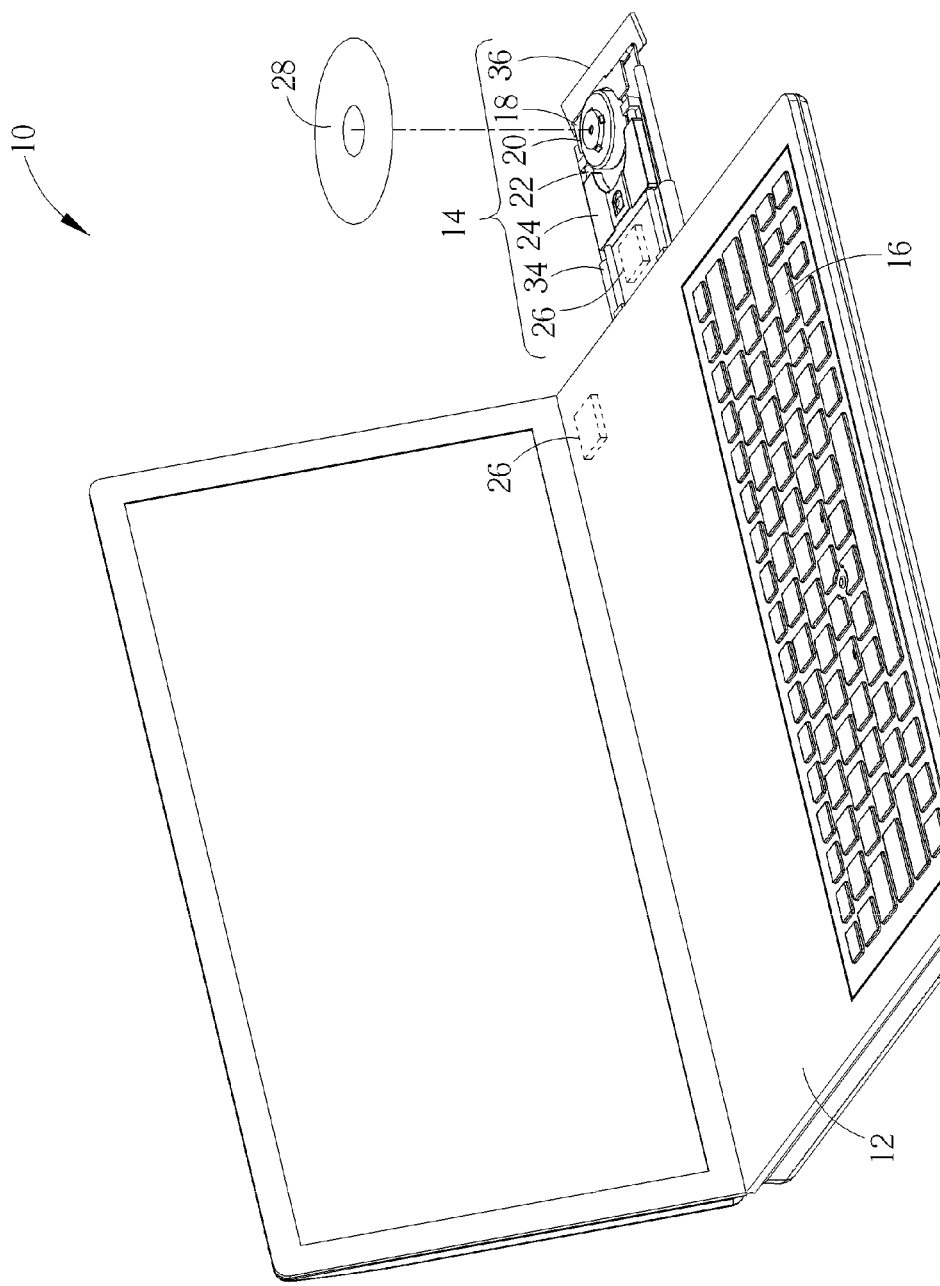
FIG. 6 and FIG. 7 respectively are diagrams of the computer device in different views according to a second embodiment of the present invention.
Figure 7:
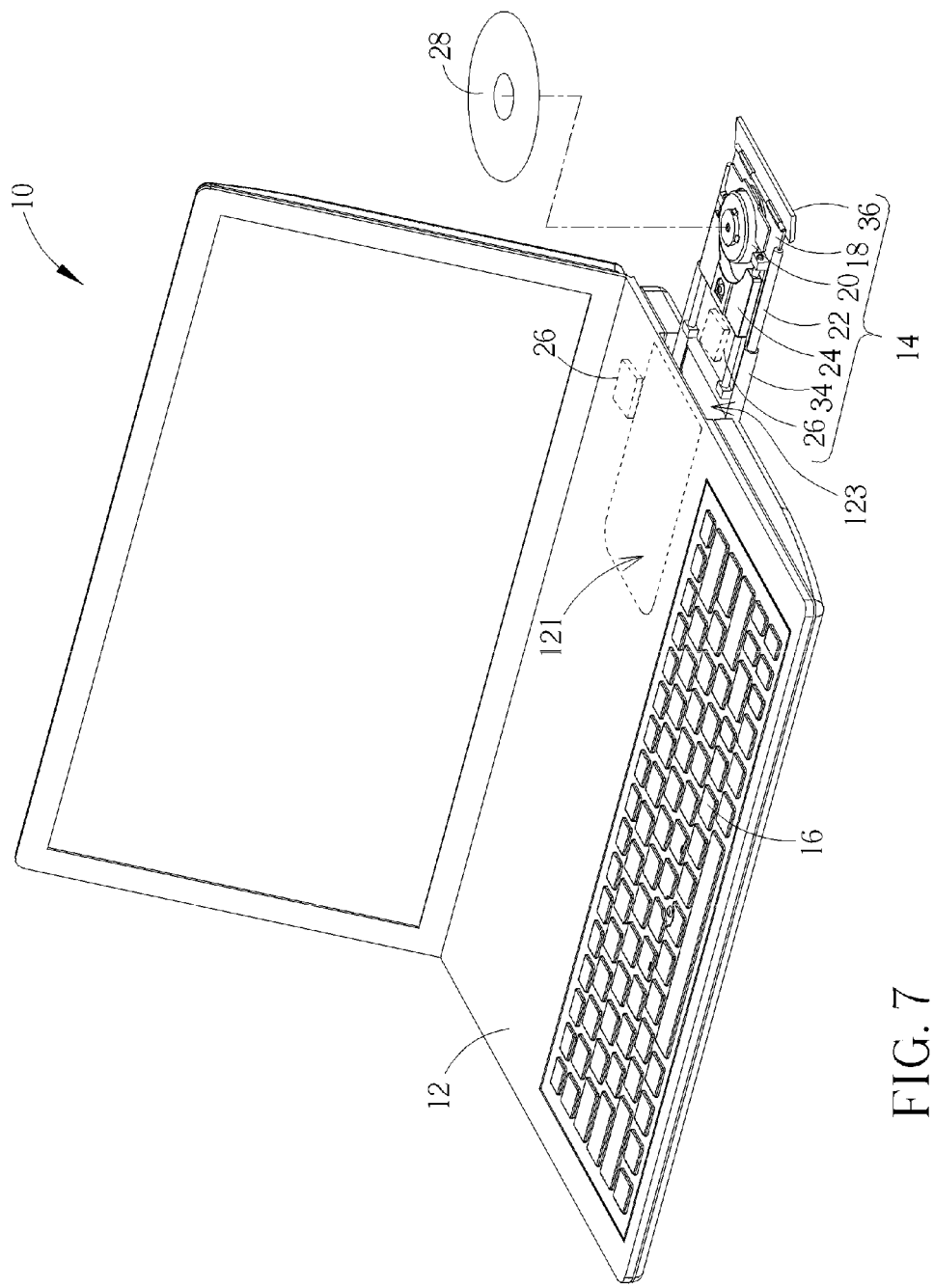

Please refer to FIG. 6 and FIG. 7. FIG. 6 and FIG. 7 respectively are diagrams of the computer device 10 in different viewing angle according to a second embodiment of the present invention. In the second embodiment, elements having the same numerals as ones of the first embodiment have the same structures and functions. Difference between the second embodiment and the first embodiment is that the disk driver 14 of the computer device 10 of the second embodiment further includes a slide mechanism 34. The slide mechanism 34 is disposed inside the sunken structure 121 and connected to the tray 18. The slide mechanism 34 slides the tray 18 relative to the casing 12 to move into and to move out of the sunken structure 121. It is to say, the disk driver 14 of the second embodiment is disposed inside the sunken structure 121 in a drawable manner. The disk driver 14 is accommodated inside the sunken structure 121 when the disk driver 14 is not in use. As utilizing the disk driver 14, the disk driver 14 is moved out of the casing 12 by a manual drawing method or a linkage driving mechanism. Meanwhile, the drive motor 20 is actuated to rotate the optical disk 28, and the optical read-in module 24 can later be actuated to slide along the track set 22 for reading the information from the optical disk 28.

In addition, the disk driver 14 of the second embodiment further includes a cover 36 in place of covering function of the tray 18 in the first embodiment. The cover 36 can be pivotably disposed on an edge of the tray 18. When the disk driver 14 is accommodated inside the sunken structure 121, the cover 36 covers an opening 123 of the sunken structure 121, so as to prevents dust from falling into the casing 12. As the tray 18 slides relative to the casing 12 and moves out of the sunken structure 121, the cover 36 is pushed away from the sunken structure 121 by the tray 18, and rotates about a predetermined angle for preventing interference with the optical disk 28 on the drive motor 20. Generally, the cover 36 rotates from a first position parallel to a lateral surface of the casing 12 to a second position substantially perpendicular to the lateral surface of the casing 12 when the disk driver 14 is started, which means the rotation angle of the cover 36 can be close to 90 degrees, so as to prevent the cover 36 from interference with the optical disk 28.

In conclusion, the computer device of the present invention disposes the disk driver and the keyboard inside the casing without overlap, so as to decrease the thickness of the computer device. For reducing dimensions of the casing, the simple disk driver of the present invention merely includes the tray, the drive motor, the track set, the driving unit and the optical read-in module. A gap between the disk driver and the keyboard is narrow, so that the present invention disposes the disk driver inside the casing in the movable manner. The disk driver can be drawn or be rotated to move out of the sunken structure of the casing when using the disk driver, so as to prevent the optical disk from interference with the casing and the other electronic components after putting on the disk driver. Therefore, the thin computer device of the present invention can include the built-in simple disk driver. The simple disk driver is not disposed under the keyboard, so as to reduce the structural thickness of the computer device, and the simple disk driver can be disposed by the keyboard to economize inner structural space of the computer device.

Comparing to the prior art, the computer device of the present invention can include equipment of the built-in disk driver and the slim casing. The built-in simple disk driver of the present invention is accommodated inside the casing when not in use, and can rapidly move out of the sunken structure of the casing for reading the optical disk. Thus, the present invention has advantages of simple structure, easy operation and low manufacturing cost, can effectively increase market competition of the computer device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer device with a built-in disk driver, the computer device comprising:
    a casing for accommodating at least one electronic component, a sunken structure being disposed on a surface of the casing; and
    a disk driver movably disposed inside the sunken structure, the disk driver comprising:
        a tray foldable connected to the casing for holding an optical disk;
        a driving circuit;
        a drive motor disposed on the tray and electrically connected to the driving circuit for rotating the optical disk;
        a track set disposed on the tray;
        an optical read-in module slidably disposed on the track set and electrically connected to the driving circuit, the optical read-in module reading information from the optical disk when the tray holds the optical disk and is located outside the sunken structure; and
        a pivot mechanism disposed on a side of the tray and inside the sunken structure adjacent to an outer of the casing, wherein a direction of a rotary axle of the pivot mechanism is substantially perpendicular to a plane normal vector of the tray, and the tray is folded to be contained inside the sunken structure and unfolded to be outside the sunken structure relative to the casing via the pivot mechanism.

2. The computer device of claim 1, wherein the driving circuit is disposed inside the casing, the driving circuit is electrically connected to the drive motor and the optical read-in module via a transmission cable, so as to control a rotary speed of the drive motor and function of the optical read-in module.

3. The computer device of claim 1, wherein the driving circuit is disposed on the tray, the driving circuit is electrically connected to the drive motor and the optical read-in module via a transmission cable, so as to control a rotary speed of the drive motor and function of the optical read-in module.

4. The computer device of claim 1, wherein the tray pivots to the casing via the pivot mechanism, so that the disk driver is disposed inside the sunken structure in a rotatable manner, and the optical read-in module is actuated to read the optical disk when the disk driver moves at the outer of the casing.

5. The computer device of claim 4, wherein the tray covers the sunken structure when the disk driver is disposed inside the sunken structure.

6. The computer device of claim 1, wherein a length of the tray is substantially greater than a radial dimension of the optical disk.

7. The computer device of claim 1, wherein the disk driver further comprises a slide mechanism disposed inside the sunken structure and connected to the tray, the slide mechanism moves the tray into and out of the sunken structure, so that the disk driver is disposed inside the sunken structure in a drawable manner, and the optical read-in module is actuated to read the optical disk when the disk driver moves at the outer of the casing.

8. The computer device of claim 7, wherein the disk driver further comprises a cover pivotably disposed on an edge of the tray, the cover covers an opening of the sunken structure when the tray moves into the sunken structure.

9. The computer device of claim 1, wherein the computer device further comprises an external protection cap, the external protection cap caps the disk driver and the optical disk when the disk driver moves out of the sunken structure, the external protection cap is partly connected to the casing when the external protection cap caps the disk driver and the optical disk.

10. A disk driver disposed on a casing of a computer device, the disk driver comprises:
    a tray foldably connected to the casing for holding an optical disk;
    a driving circuit;
    a drive motor disposed on the tray and electrically connected to the driving circuit for rotating the optical disk;
    a track set disposed on the tray;
    an optical read-in module slidably disposed on the track set and electrically connected to the driving circuit, the optical read-in module reading information from the optical disk when the tray holds the optical disk and is located outside the sunken structure; and
    a pivot mechanism disposed on a side of the tray and inside the sunken structure adjacent to an outer of the casing, wherein a direction of a rotary axle of the pivot mechanism is substantially perpendicular to a plane normal vector of the tray, and the tray is folded to be contained inside the sunken structure and unfolded to be outside the sunken structure relative to the casing via the pivot mechanism.

11. The disk driver of claim 10, wherein the driving circuit is disposed inside the casing, the driving circuit is electrically connected to the drive motor and the optical read-in module via a transmission cable.

12. The disk driver of claim 10, wherein the driving circuit is disposed on the tray, the driving circuit is electrically connected to the drive motor and the optical read-in module via a transmission cable.

13. The disk driver of claim 10,
    wherein the tray pivots to the casing via the pivot mechanism so that the disk driver is disposed inside the sunken structure in a rotatable manner, and the optical read-in module is actuated to read the optical disk when the disk driver moves at the outer of the casing.

14. The disk driver of claim 13, wherein the tray covers the sunken structure when the disk driver is disposed inside the sunken structure.

15. The disk driver of claim 10, wherein a length of the tray is substantially greater than a radial dimension of the optical disk.

16. The disk driver of claim 10, further comprising:
a slide mechanism disposed inside the sunken structure and connected to the tray, the slide mechanism moving the tray into and out of the sunken structure so that the disk driver is disposed inside the sunken structure in a drawable manner, the optical read-in module being actuated to read the optical disk when the disk driver moves at the outer of the casing.

17. The disk driver of claim 16, further comprising:
a cover pivotably disposed on an edge of the tray, the cover covering an opening of the sunken structure when the tray moves into the sunken structure.

* * * * *